(12) United States Patent
Ricco

(10) Patent No.: US 6,729,313 B2
(45) Date of Patent: May 4, 2004

(54) TANK FOR A SYSTEM FOR INJECTION SUPPLY OF LPG FOR INTERNAL-COMBUSTION ENGINES

(75) Inventor: Mario Ricco, Orbassano (IT)

(73) Assignee: C.R.F. Societa Consortile per Azioni, Turin (IT)

(*) Notice: Subject to any disclaimer, the term of this patent is extended or adjusted under 35 U.S.C. 154(b) by 59 days.

(21) Appl. No.: 10/120,611

(22) Filed: Apr. 12, 2002

(65) Prior Publication Data
US 2002/0148450 A1 Oct. 17, 2002

(30) Foreign Application Priority Data
Apr. 13, 2001 (IT) ..................... TO2001A0360

(51) Int. Cl.⁷ ............................................. F02B 43/00
(52) U.S. Cl. ........................................ 123/525; 123/527
(58) Field of Search ................. 123/514, 527, 123/525, 497

(56) References Cited

U.S. PATENT DOCUMENTS

| 5,277,168 A | * | 1/1994 | Kondo et al. ............ 123/519 |
| 5,291,869 A | * | 3/1994 | Bennett ................... 123/527 |
| 6,050,237 A | * | 4/2000 | Ferrera et al. ........... 123/276 |
| 6,216,675 B1 | * | 4/2001 | Bennett ................... 123/541 |
| 6,244,917 B1 | * | 6/2001 | Hartke et al. .......... 440/88 R |

* cited by examiner

Primary Examiner—Tony M. Argenbright
Assistant Examiner—Hyder Ali
(74) Attorney, Agent, or Firm—Sughrue Mion, PLLC

(57) ABSTRACT

In a tank for a system for injection supply of LPG for internal-combustion engines, a number of hydraulic-connection elements associated to a service flange which closes the top opening of the tank are mounted on said flange by fixing to the bottom surface of the latter, without having any parts that are mounted via through holes of the flange. Provided inside the tank is an electrically operated pump which is fixed to the bottom wall of the tank structure and which in turn carries the structure of a level-sensing device of a capacitive type.

6 Claims, 3 Drawing Sheets

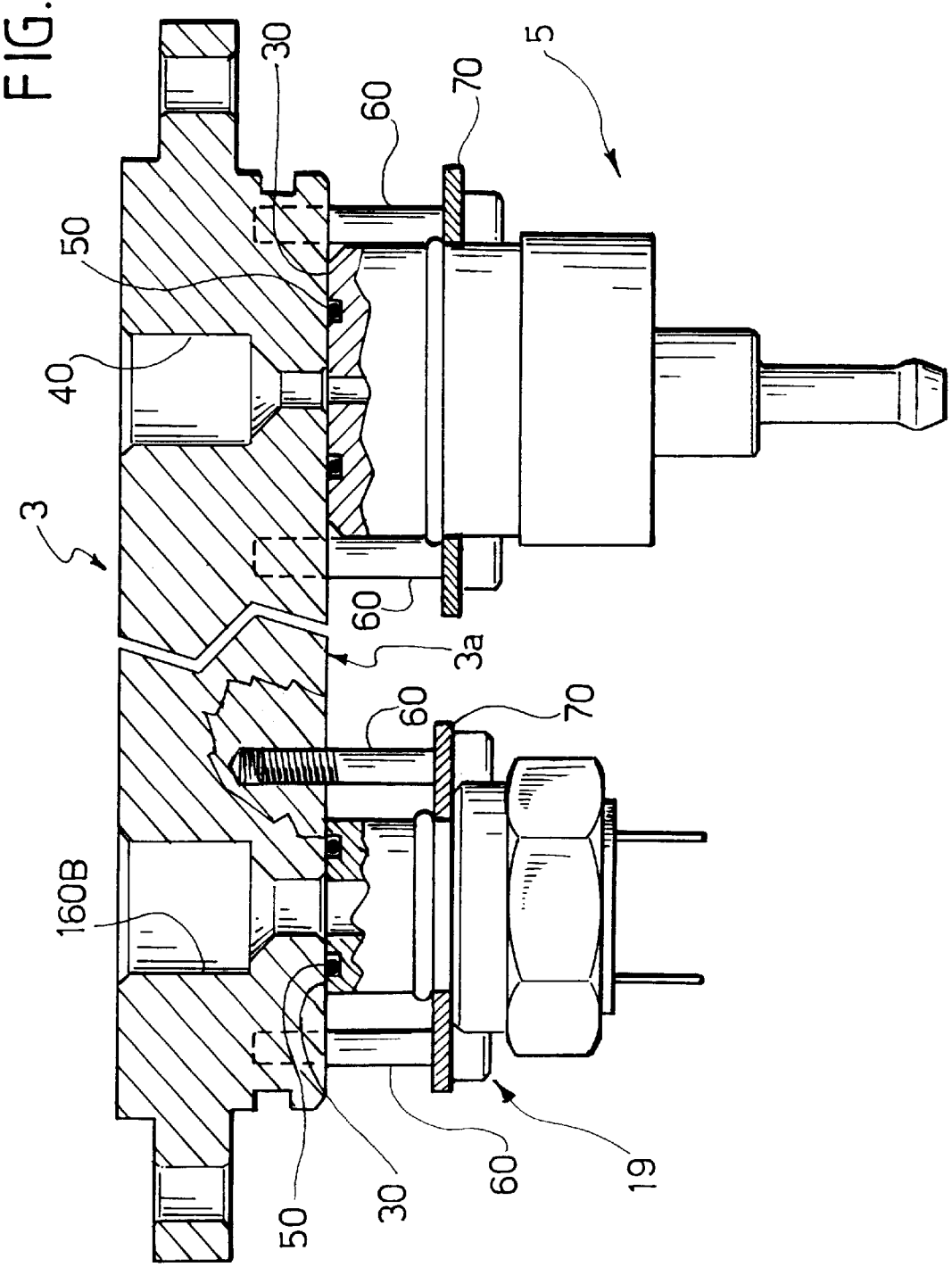

TANK FOR A SYSTEM FOR INJECTION SUPPLY OF LPG FOR INTERNAL-COMBUSTION ENGINES

BACKGROUND OF THE INVENTION

The present invention relates to systems for injection supply of LPG for internal-combustion engines.

The invention relates in particular to a system for injection supply of LPG, of the type comprising a hollow structure having a top opening closed by a service flange that carries means for the hydraulic and electrical connections of the tank to the fuel-supply system.

Tanks of the type specified above are described, for example, in the European patent EP-B-0 922 851 in the name of the present applicant and in the corresponding U.S Pat. No. 6,050,237.

In tanks of the above type so far produced, the aforesaid means for the hydraulic and electrical connections of the tank to the supply system include:

a first hole for connection with the pipe for delivery of LPG to the injectors of the fuel-supply system (preferably served by a distribution manifold);

a valve assembly associated to said first connection hole, including a flow-limiting valve and a shutoff solenoid valve;

a second hole for connection with the pipe for flow back into the tank of the excess LPG fed to the injectors;

a return valve associated to said second connection hole;

a solenoid valve for filling of the tank;

a safety valve for preventing the pressure inside the tank from exceeding a pre-set threshold value; and an electrical connection device for electrical supply to the electrically operated devices present inside the tank.

SUMMARY OF THE INVENTION

Again according to the prior art described above, set inside the tank are an electrically operated pump and a level-sensing device.

One purpose of the present invention is to simplify the structure of the tank and in particular the structure of the aforesaid service flange. A further purpose is to improve the efficiency of the various parts associated to the tank, with particular regard to the reliability and precision of operation of the level-sensing device.

With a view to achieving the above purposes, the subject of the invention is a tank having all the characteristics that have not been mentioned above and being moreover characterized in that the aforesaid valve assembly including the shutoff valve and the flow-limiting valve, the aforesaid return valve and the aforesaid filling valve each have a structure set entirely underneath the service flange and fixed against the bottom surface of the latter, without having any parts mounted via through holes of the flange. Preferably, each of said assemblies has an attachment flange which is fixed by means of screws underneath the service flange.

Thanks to the above-mentioned characteristics, the structure and conformation of the service flange are extremely simplified as compared to those adopted in the known solutions.

In addition, with a view to achieving the further purpose specified above, the tank according to the invention is moreover characterized in that the aforesaid sensor device is of a capacitive type and has a structure rigidly connected to the structure of tank, independently of the aforesaid service flange. Thanks to this characteristic, a better precision of the sensor is achieved, without moreover having to resort to the use of a float, unlike the case of known solutions which, instead, do use a sensor with a float. The said float must in fact be made of a material with a low specific weight, given that LPG has a specific weight which is approximately one half that of water. Consequently, in the case of known solutions the risk arises that the light material of the float may collapse on account of the pressure to which it is subjected, thus reducing in volume. The use of the sensor of a capacitive type according to the invention provides a radical solution to said problem.

Preferably, moreover, also the electrically operated pump which is set inside the tank is rigidly connected to the structure of the latter, unlike what occurs in the case of known solutions, in which the pump is secured to the service flange.

BRIEF DESCRIPTION OF THE DRAWINGS

Further characteristics and advantages of the present invention will emerge from the ensuing description, with reference to the attached drawings, which are provided purely by way of non-limiting example and in which:

FIG. 3 is a view at an enlarged scale and partially sectioned of a detail of an embodiment of the tank according to the invention.

DETAILED DESCRIPTION OF THE INVENTION

Figure 1:
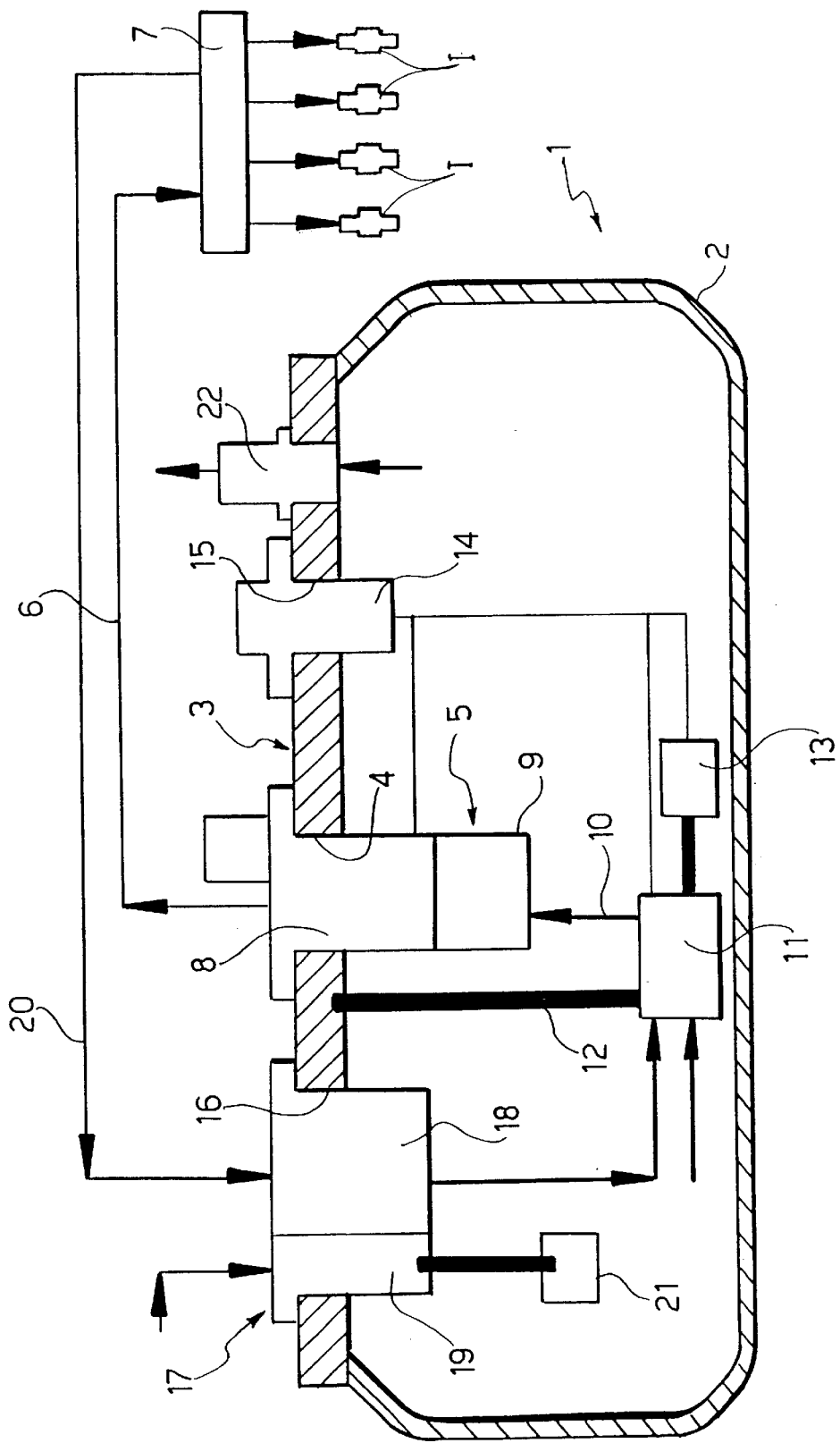
FIG. 1 is a schematic cross-sectional view of a tank according to the prior art.

In FIG. 1, the reference number 1 designates, as a whole, an LPG tank, built according to the prior art, for supplying LPG to a plurality of injectors I associated to the various cylinders of the engine. The tank 1 has a hollow structure 2 made in such a way as to guarantee tightness at the operating pressures envisaged for a system of the type in question. The hollow structure 2 has a top opening closed by a service flange 3 which carries the various connector elements and unions for connection between the tank and the fuel-supply system. For this purpose, the tank 1 built in accordance with the prior art has a first through opening 4 through which is mounted the structure of an assembly 5 connected to a line 6 for delivery of LPG to a distribution manifold or rail 7, which distributes the LPG among the various injectors I. The assembly 5 includes a shutoff solenoid valve 8, which is designed to shut, thus interrupting communication of the tank with the outside environment in pre-determined emergency conditions, as well as a flow-limiting valve 9. The assembly 5 receives the LPG through a line 10 from an electrically operated pump 11, the structure of which is carried, via a connection element 12, by the service flange 3. The pump 11 in turn carries the structure of a sensor device which detects the level of the fuel 13. Electrical supply to the solenoid valve 8, to the pump 11, and to the sensor 13 is guaranteed by an electrical connector 14, which is mounted by means of a through opening 15 of the service flange 3. The latter moreover has a through opening 16, inside which there is mounted an assembly 17, which includes two valves 18, 19. The valve 18 is a return valve, which is connected to a line 20 for reflow into the tank of the excess LPG supplied to the rail 7. The valve 19 is the valve used for filling the tank and is associated to a further level sensor 21. Also associated to the flange 3 is a safety valve 22, which prevents the pressure inside the tank from exceeding a predetermined threshold value.

Figure 2:
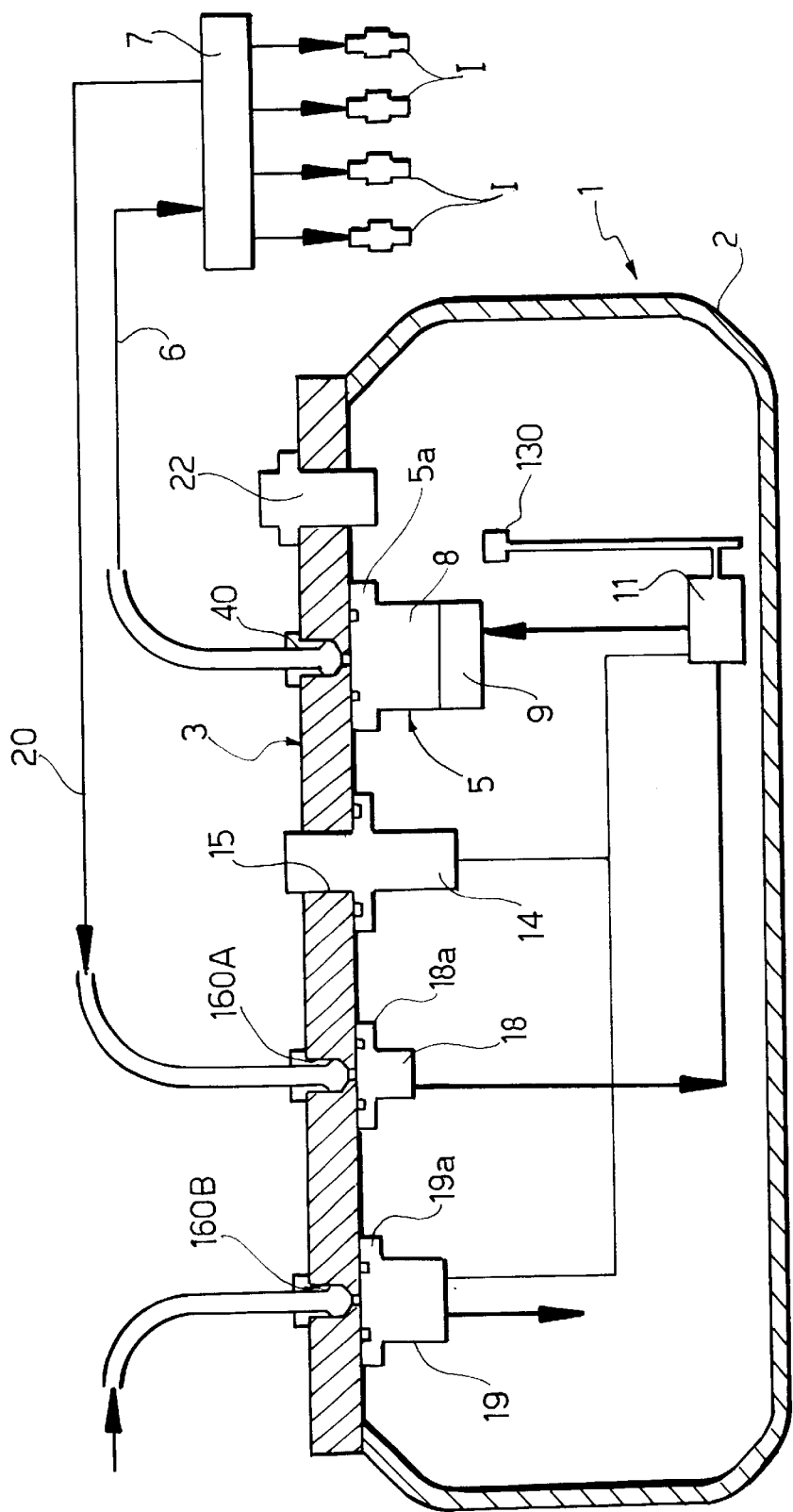
FIG. 2 is a schematic cross-sectional view of a tank according to the invention.

FIG. 2 is a schematic illustration of how the tank is modified according to the invention. In FIG. 2, the parts in common with those illustrated in FIG. 1 are designated by the same reference numbers.

The main difference with respect to the solution illustrated in FIG. 1 lies in the fact that the assembly 5, the valve 18 and the valve 19 (which in this case are mounted in separate positions) each present a structure entirely set beneath the service flange 3 and fixed against the bottom surface of the latter. In particular, in the case of the example illustrated, the assembly 5, the valve 18 and the valve 19 have respective attachment flanges 5a, 18a, 19a which are fixed by means of screws (not illustrated) to the flange 3. In positions corresponding to the said elements, then, the flange 3 has only connectors 40, 160A, 160B, and the said elements are not mounted via through openings of the flange as, instead, may be seen in the case of FIG. 1. The mounting that may be seen in FIG. 1 remains unaltered only as regards the safety valve 22 and the electrical connector device 14, since for the said elements this type of installation cannot be avoided.

According to a further characteristic of the invention, the level sensor, designated by 130 in FIG. 2, is for example a capacitive-type sensor and has a structure rigidly connected to the pump 11, which in this case is in turn connected to the bottom wall of the tank 2, to the advantage of the operating precision of the sensor.

FIG. 3 is a cross-sectional view of a practical embodiment of the service flange 3, of the valve 19 and of the assembly 5. In this case, each of said elements has a resting surface 30 pressed against the bottom surface 3a of the service flange 3, with interposition of an O-ring 50, by means of screws 60 which are screwed in threaded holes made in the flange 3 and have their heads resting against plates 70 that press the structures of the aforesaid elements against the bottom surface of the flange 3.

Of course, without prejudice to the principle of the invention, the details of construction and the embodiments may vary widely with respect to what is described and illustrated herein purely by way of example, without thereby departing from the scope of the present invention.

What is claimed is:

1. A tank for a system of injection supply of LPG for internal-combustion engines, comprising a hollow structure having a top opening closed by a service flange that carries means for the hydraulic and electrical connections of the tank to the fuel-supply system, said means including:
    a first hole for connection with a pipe for delivery of LPG to the injectors of the fuel supply system;
    a valve assembly including a flow-limiting valve and a shutoff solenoid valve, associated with said first connection hole;
    a second hole for connection with the pipe for flowback into the tank of the excess LPG fed to the injectors;
    a return valve associated with said second connection hole;
    a third hole for filling said tank;
    a filling valve associated with said third hole for controlling filling of the tank;
    a safety valve for preventing the pressure inside the tank from exceeding a pre-set threshold value; and
    an electrical connection device,
    wherein the valve assembly, the return valve and the filling valve each have an annular flange secured by screws to an inner surface of said service flange and each have an annular recess with an annular seal therein surrounding said associated holes respectively and engaging said inner surface.

2. The tank according to claim 1 wherein each annular flange is integral with a body portion of each valve.

3. The tank according to claim 1 wherein each annular flange is a separate element connected to each respective valve in spaced relation to said inner surface of said service flange.

4. The tank according to claim 1, wherein set inside the tank is an electrically driven pump the structure of which is fixed to the bottom wall of the structure of the tank.

5. The tank according to claim 4, wherein said tank comprises within it a level-sensor device of a capacitive type, the structure of which is rigidly connected to the tank structure.

6. The tank according to claim 5, wherein said capacitive sensor is carried by the structure of the pump.

* * * * *